(No Model.)

E. E. KIMBALL.
THILL COUPLING.

No. 470,892. Patented Mar. 15, 1892.

WITNESSES.
A. D. Harrison
J. A. McShane

INVENTOR.
E. E. Kimball
by
Wright, Brown & Crossley
Attys

UNITED STATES PATENT OFFICE.

ELBRIDGE E. KIMBALL, OF PEABODY, MASSACHUSETTS.

THILL-COUPLING.

SPECIFICATION forming part of Letters Patent No. 470,892, dated March 15, 1892.

Application filed June 26, 1891. Serial No. 397,593. (No model.)

*To all whom it may concern:*

Be it known that I, ELBRIDGE E. KIMBALL, of Peabody, in the county of Essex and State of Massachusetts, have invented certain new and useful Improvements in Thill-Couplings, of which the following is a specification.

This invention has for its object to provide a simple and effective coupling for connecting a thill-iron to the ears on a carriage-axle in such manner as to prevent the thill-iron from dropping from between said ears in case the bolt that connects said iron and ears is removed accidentally or otherwise.

The invention consists in the improvements which I will now proceed to describe and claim.

Figure 1:
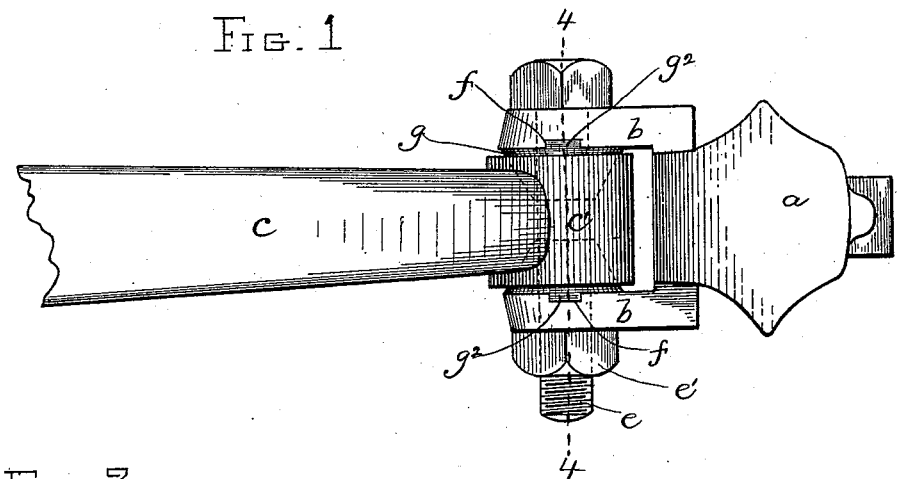
Figure 2:
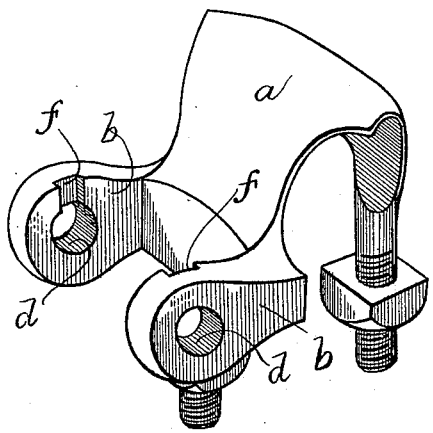
Figure 3:
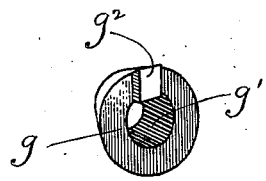
Figure 4:
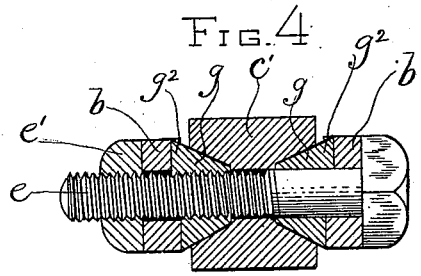
Figure 5:
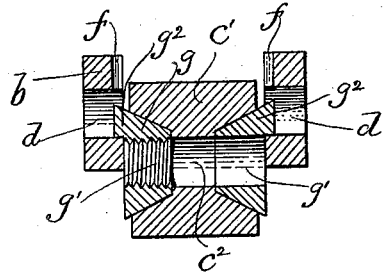

Of the accompanying drawings, forming a part of this specification, Figure 1 represents a top plan view of a thill-coupling embodying my invention. Fig. 2 represents a perspective view of the axle-clip and ears disconnected from the other parts of the coupling. Fig. 3 represents a perspective view of one of the conical washers. Fig. 4 represents a section on line 4 4, Fig. 1. Fig. 5 represents a section similar to Fig. 4, showing the connecting-bolt removed.

The same letters of reference indicate the same parts in all the figures.

In the drawings, $a$ represents the clip, which is applied to the axle, and $b\ b$ represent the ears, which are formed on said clip and project forward from the axle for engagement with the thill-iron $c$. The ears $b\ b$ are provided with holes $d\ d$ for the reception of the bolt $e$, which connects the thill-iron $c$ with the ears $b\ b$.

$f\ f$ represent slots formed in the inner sides of the ears $b\ b$, said slots extending from the upper edges of said ears down to the holes $d\ d$, but not below said holes, the portions of the ears below the holes constituting stops to arrest the downward movement of tenons formed to enter said slots, as hereinafter described.

$g\ g$ represent conical metal washers, which are provided with central holes $g'$, formed to receive the bolt $e$. The bases or flat sides of said washers are provided with tenons $g^2$, (each washer having one tenon,) formed to enter the slots $f$.

The thill-iron $c$ has a socket $c'$ at its end formed to enter the space between the ears $b\ b$. Said socket has an orifice $c^2$ to receive the bolt $e$, said orifice being enlarged at its ends to receive the conical sides of the washers $g\ g$, as shown in Fig. 4.

In connecting the thill-iron to the ears $b\ b$ the washers are placed in the enlarged ends of the hole $c^2$ in the socket $c'$, the tenons $g^2$ being at the top and the flat sides of the washers about flush with the ends of the socket. The socket is then raised above the ears $b\ b$ and lowered between said ears until the hole $c^2$ in the socket is in line with the holes $d$ in the ears, the tenons $g^2$ being thus caused to enter the slots $f$. The bolt $e$ is then inserted and secured by its nut $e'$, thus completing the connection of the thill-iron to the ears $b\ b$. It will be seen that the tenons $g^2$ on the washers entering the slots $f$ in the ears $b$ prevent the washers $g$ from being separated from the ears in any direction but an upward one, so that if the bolt $e$ be withdrawn by accident or otherwise the socket $c'$ will not drop out from between the ears $b\ b$, but will fall to the position shown in Fig. 5, where it will be arrested by the bearing of the tenons $g^2\ g^2$ on the portions of the ears below the holes $d$.

My improved coupling has all the advantages resulting from the employment of conical washers, and a slot-and-tenon connection between the socket on the thill-iron and the ears on the axle. I am aware that it is not new to interpose conical washers between the ends of the socket on the thill-iron and the ears on the axle, said washers fitting conical enlargements of the bolt-hole in the socket. I am also aware that it is not new to provide the ears with slots open at the top of the ears to receive projections on the thill-iron, the arrangement being such that the thill-iron can only be inserted by a downward movement and removed by an upward movement; but I am the first, so far as I am aware, to combine the conical washers, slots, and sockets.

One of the conical washers $g$ is internally screw-threaded to engage the threaded portion of the bolt $e$, so that the washers may be adjusted to compensate for wear of their conical surfaces and the corresponding surfaces of the cavities in the socket $c'$. It will be seen that by rotating the bolt $e$ in one direction the internally-threaded washer $g$, which is prevented by the tenon and slot from rotating with the bolt, is moved inwardly toward the opposite washer, so that any wear or looseness is taken up, the tenon and slot permitting the washer to move inwardly and preventing it from rotating. I am thus enabled to compensate for wear without bending the ears $b\ b$ inwardly. This feature of the invention—viz., the two washers, one made without a screw-thread and the other internally threaded to engage the threaded portion of the bolt and be adjusted by the latter to compensate for wear of the bearing-surfaces of the washers and socket—is not necessarily limited to use in connection with the slots and tenons, as other means may be used to prevent the rotation of the internally-threaded washer without departing from the spirit of this feature of my invention.

I claim—

1. The improved thill-coupling consisting of the ears $b\ b$, formed in the axle-clip and provided with bolt-receiving holes $d\ d$ and with slots $f\ f$ in their inner sides extending from the upper edges of the ears to but not below said holes, the conical washers $g\ g$, having bolt-receiving holes $g'\ g'$ and tenons $g^2\ g^2$, said tenons being at one side only of the bolt-holes and adapted to enter the slots $f\ f$ in the ears $b$, the thill-iron having the socket provided with a hole to receive a bolt $e$ and with conical enlargements at the ends of said hole to receive the conical washers, and the bolt formed to pass through the said ears, washers, and sockets and support the thill-iron and washers, the portion of said ears below the bolt-holes being adapted to engage and support the tenons on the washers in case of the withdrawal of the bolt and thereby prevent the separation of the thill-iron from the ears in a downward direction, the thill-iron and tenoned washers being enabled by the slots $f$ to be separated from the ears by an upward movement when the bolt is removed, as set forth.

2. In a thill-coupling, the combination of the ears $b\ b$, the thill-iron having a bolt-receiving socket, washers interposed between the inner sides of the ears and the thill-iron and formed to bear on the ends of said socket, one of said washers having a smooth or unthreaded bolt-hole and the other a threaded bolt-hole, the bolt formed to pass through the ears, socket, and washers, a portion of said bolt being screw-threaded to engage the washer having the threaded hole, and means, such as a tenon on the outer end of the threaded washer and a slot in the inner side of the corresponding ear, for preventing the rotation of the threaded washer, whereby the rotation of the bolt is caused to adjust the threaded washer to compensate for wear, the engagement of the threaded washer with the accompanying ear $b$ being such that said washer can be moved inwardly from the ear to compensate for wear, as set forth.

In testimony whereof I have signed my name to this specification, in the presence of two subscribing witnesses, this 22d day of June, A. D. 1891.

ELBRIDGE E. KIMBALL.

Witnesses:
 C. F. BROWN,
 A. D. HARRISON.